US011070629B2

(12) United States Patent
Tsirkin et al.

(10) Patent No.: US 11,070,629 B2
(45) Date of Patent: *Jul. 20, 2021

(54) MIGRATION NOTIFICATION AND RESPONSE MESSAGES FOR VIRTUAL MACHINES

(71) Applicant: Red Hat Israel, LTD, Raanana (IL)

(72) Inventors: Michael Tsirkin, Westford, MA (US); Amnon Ilan, Katzir (IL)

(73) Assignee: Red Hat Israel, LTD, Raanana (IL)

( * ) Notice: Subject to any disclaimer, the term of this patent is extended or adjusted under 35 U.S.C. 154(b) by 187 days.

This patent is subject to a terminal disclaimer.

(21) Appl. No.: 15/691,605

(22) Filed: Aug. 30, 2017

(65) Prior Publication Data

US 2019/0068724 A1 Feb. 28, 2019

(51) Int. Cl.
*G06F 15/16* (2006.01)
*H04L 29/08* (2006.01)
(Continued)

(52) U.S. Cl.
CPC ........ *H04L 67/148* (2013.01); *G06F 9/45554* (2013.01); *G06F 9/45558* (2013.01); *H04L 61/2007* (2013.01); *H04L 61/2076* (2013.01); *H04L 61/2084* (2013.01); *H04L 61/6022* (2013.01); *G06F 9/45533* (2013.01); (Continued)

(58) Field of Classification Search
CPC .................................................... H04L 67/148
See application file for complete search history.

(56) References Cited

U.S. PATENT DOCUMENTS 7,013,482 B1 3/2006 Krumel
7,492,787 B2 2/2009 Ji et al.
(Continued)

FOREIGN PATENT DOCUMENTS

CN 103299278 9/2013
CN 105208048 12/2015
(Continued)

OTHER PUBLICATIONS

Gigamon, "Network Monitoring for Virtual Server Environments", Solution Brief, https://www.gigamon.com/sites/default/files/resources/solutions/sb-network-monitoring-for-virtual-server-environments-3115.pdf, 2014, 2 pages.

(Continued)

*Primary Examiner* — Kevin T Bates
*Assistant Examiner* — Clarence D McCray
(74) *Attorney, Agent, or Firm* — Lowenstein Sandler LLP

(57) ABSTRACT

An indication that a virtual machine has been migrated may be received. In response to receiving the indication, one or more network addresses associated with the virtual machine may be identified. A notification message corresponding to the one or more network addresses may be generated. The notification message may be transmitted on networks for the one or more network addresses. The virtual machine may determine whether a response message has been received for each of the one or more network addresses. The virtual machine may transmit a subsequent notification message in view of determining that at least one response message has not been received for at least one of the one or more network addresses.

20 Claims, 6 Drawing Sheets

(51) Int. Cl.
  *H04L 29/12* (2006.01)
  *G06F 9/455* (2018.01)
(52) U.S. Cl.
  CPC ............... *G06F 2009/4557* (2013.01); *G06F 2009/45595* (2013.01)

(56) References Cited

U.S. PATENT DOCUMENTS

| | | | |
|---|---|---|---|
| 7,761,573 | B2 | 7/2010 | Travostino et al. |
| 8,396,986 | B2 | 3/2013 | Kanada et al. |
| 8,413,147 | B2 | 4/2013 | Shen et al. |
| 8,429,647 | B2 | 4/2013 | Zhou et al. |
| 8,539,045 | B2 | 9/2013 | Kang et al. |
| 8,819,678 | B2 | 8/2014 | Tsirkin |
| 8,850,430 | B2 | 9/2014 | Hayward et al. |
| 8,924,560 | B2 | 12/2014 | Pang et al. |
| 8,966,495 | B2 | 2/2015 | Kulkarni |
| 9,008,084 | B2 | 4/2015 | Zhang et al. |
| 9,081,603 | B2 | 7/2015 | Zhang et al. |
| 9,104,460 | B2 | 8/2015 | Jansen |
| 9,141,625 | B1 | 9/2015 | Thornewell et al. |
| 9,160,668 | B2 | 10/2015 | Tripathi et al. |
| 9,229,755 | B2 | 1/2016 | Dow et al. |
| 9,336,042 | B1 | 5/2016 | Brenneman et al. |
| 9,350,614 | B2 | 5/2016 | Zeng et al. |
| 9,396,022 | B2 | 7/2016 | Miyazaki |
| 9,424,144 | B2 | 8/2016 | Sridharan et al. |
| 9,565,126 | B2 | 2/2017 | Narayanasamy et al. |
| 9,628,290 | B2 | 4/2017 | Banavalikar et al. |
| 9,836,327 | B1 | 12/2017 | Brouwer et al. |
| 2008/0222375 | A1 | 9/2008 | Kotsovinos et al. |
| 2009/0183173 | A1 | 7/2009 | Becker et al. |
| 2011/0134931 | A1 | 6/2011 | Merwe et al. |
| 2012/0110181 | A1 | 5/2012 | Tsirkin |
| 2013/0232492 | A1 | 9/2013 | Wang |
| 2013/0238802 | A1 | 9/2013 | Sarikaya |
| 2013/0262647 | A1 | 10/2013 | Kurita et al. |
| 2013/0275592 | A1 | 10/2013 | Xu et al. |
| 2013/0305242 | A1 | 11/2013 | Wang et al. |
| 2014/0007089 | A1 | 1/2014 | Bosch et al. |
| 2014/0025821 | A1 | 1/2014 | Baphna et al. |
| 2014/0289399 | A1 | 9/2014 | Shimokuni et al. |
| 2014/0297889 | A1 | 10/2014 | Dong et al. |
| 2014/0298335 | A1 | 10/2014 | Regev et al. |
| 2015/0029856 | A1 | 1/2015 | Rozenberg |
| 2015/0117256 | A1 | 4/2015 | Sabaa et al. |
| 2015/0222515 | A1 | 8/2015 | Mimura et al. |
| 2015/0309818 | A1 | 10/2015 | Lee et al. |
| 2015/0370596 | A1* | 12/2015 | Fahs ............. G06F 9/46 718/1 |
| 2015/0378759 | A1 | 12/2015 | Pershin et al. |
| 2016/0004548 | A1* | 1/2016 | Suzuki ........... G06F 9/54 718/1 |
| 2016/0070601 | A1* | 3/2016 | Yamamoto ....... G06F 9/5088 718/105 |
| 2016/0077935 | A1 | 3/2016 | Zheng et al. |
| 2016/0103699 | A1 | 4/2016 | Thakkar et al. |
| 2016/0117185 | A1 | 4/2016 | Fang et al. |
| 2016/0246632 | A1 | 8/2016 | Tsirkin |
| 2016/0323245 | A1 | 11/2016 | Shieh et al. |
| 2016/0378530 | A1 | 12/2016 | Ramasubramanian et al. |
| 2017/0005923 | A1 | 1/2017 | Babakian |
| 2017/0019328 | A1 | 1/2017 | Moreno et al. |
| 2017/0139742 | A1 | 5/2017 | Cropper et al. |
| 2017/0264496 | A1* | 9/2017 | Ao ............. H04L 12/4633 |
| 2017/0359414 | A1 | 12/2017 | Sengupta et al. |
| 2018/0091591 | A1* | 3/2018 | Puri ............. H04L 67/1095 |

FOREIGN PATENT DOCUMENTS

| | | |
|---|---|---|
| EP | 2698957 B1 | 7/2016 |
| WO | WO2012051884 | 8/2012 |
| WO | WO2012119390 | 9/2012 |
| WO | 2017210641 A1 | 12/2017 |

OTHER PUBLICATIONS

Vae, Karim, "Azure: How to Prepare for Maintenance Impacting your Virtual Machines", The insights of a Quirky Cloud Solution Architect on his Journey Through the Fast Paced IT Landscape, http://kvaes.wordpress.com/2017/02/13/azure-how-to-prepare-for-maintenance-impacting-your-virtual-machines/, Feb. 13, 2017, 6 pages.

Li et al., "HyperMIP: Hypervisor Controlled Mobile IP for Virtual Machine Live Migration Across Networks", School of Computer Science and Engineering, Beihang University, Beijing, China, accessed, Jun. 28, 2017, 9 pages, https://pdfs.semanticscholar.gor/661e/4e7dcde6197740184466a16daf7397238184.pdf.

"A Virtual Machine Loses Network Connectivity after vMotion (1007464)", VMWare Knowledge Base, Nov. 29, 2016, 2 pages, https://kb.vmware.com/selfservice/microsites/search.do?language=en_US&cmd=displayKC&externalId=1007464.

Wang et al., "Virtual Routers on the Move: Live Router Migration as a Network-Management Primitive", Princeton University, Princeton, NJ, USA; AT&T Labs—Research, Florham Park, NJ, USA, Aug. 17-22, 2008, 12 pages, http://www.cs.princeton.edu/courses/archive/fall10/cos561/papers/VROOM08.pdf.

Cully et al., "Remus: High Availability via Asynchronous Virtual Machine Replication", Department of Computer Science the University of British Columbia, accessed Jun. 27, 2017, 21 pages, http://www.usenix.org/legacy/event/nsdi08/tech/full_papers/cully/cully_html/.

Stuart, Morgan, "Mitigating Interference during Virtual Machine Live Migration through Storage Offloading", retrived from http://scholarscompass.vcu.edu/cgi/viewcontent.cgi?referer=https://www.google.co.in/&httpsredir=1&article=5724&context=etd, Virginia Commonwealth University, Richmond, Virginia, USA, Dec. 2016, 71 pages.

Shen, Z, et al., "Follow the Sun through the Clouds: Application Migration for Geographically Shifting Workloads", retrived from https://pdfs.semanticscholar.org/e76e/6d0753a4136337f1d10d94257825bd7a1cfd.pdf, Cornell University, In SoCC. ACM, Oct. 5-7, 2016, 14 pages.

Vmware, "More a Virtual Machine to a New Locationor Host", Jul. 28, 2017, 1 page.

Microsoft Corporation, Simplify Virtual Machine Management and Migration with Ethernet Fabrics in the Datacenter, published Mar. 2011, downloaded from https://www.brocade.com/content/dam/common/documents/content-types/whitepaper/brocade-ms-ethernet-fabric-solution-blueprint.pdf.

Nobel, Rickard, The vSwitch "Notify Switches" setting, Rickard Nobel VMware, Windows, Storage and Networking, Jul. 14, 2012, downloaded from: http://rickardnobel.se/vswitch-notify-switches-setting/.

Nachum et al., Scaling the Address Resolution Protocol for Large Data Centers (SARP), Feb. 24, 2013, downloaded from https://tools.ietf.org/id/draft-nachum-sarp-04.txt.

Silvera et al., "IP Mobility to Support Live Migration of Virtrual Machines Across Subnets", SYSTRO May 4-6, 2009, 10 pages.

Kalim et al., "Seamless Migration of Virtual Machines Across Networks", IEEE, 2013, 7 pages.

Bifulco, et al., "Transparent Migration of Virtual Infrastructures in Large Datacenters for Cloud Computing", IEEE, 2011 pp. 179-184.

* cited by examiner

MIGRATION NOTIFICATION AND RESPONSE MESSAGES FOR VIRTUAL MACHINES

TECHNICAL FIELD

The present disclosure is generally related to virtualization, and is more specifically related to transmitting a notification message in response to a virtual machine being migrated.

BACKGROUND

Network virtualization may be software-emulated representations of physical network components of physical network infrastructure used to provide corresponding virtual network components to a host computer system. The host computer system may execute a host operating system (OS) to run an application container. A host computer system may also execute a hypervisor to run one or more virtual machines (VM). The host computer system may be used for network virtualization. The host computer system may include both physical and virtual network components to be used for network virtualization. Physical network components may include networking hardware such as routers, bridges, switches, and network interface cards (NICs) used to facilitate the transmission of data in a computer network. Virtual network components may be software-emulated representations of corresponding physical network components.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
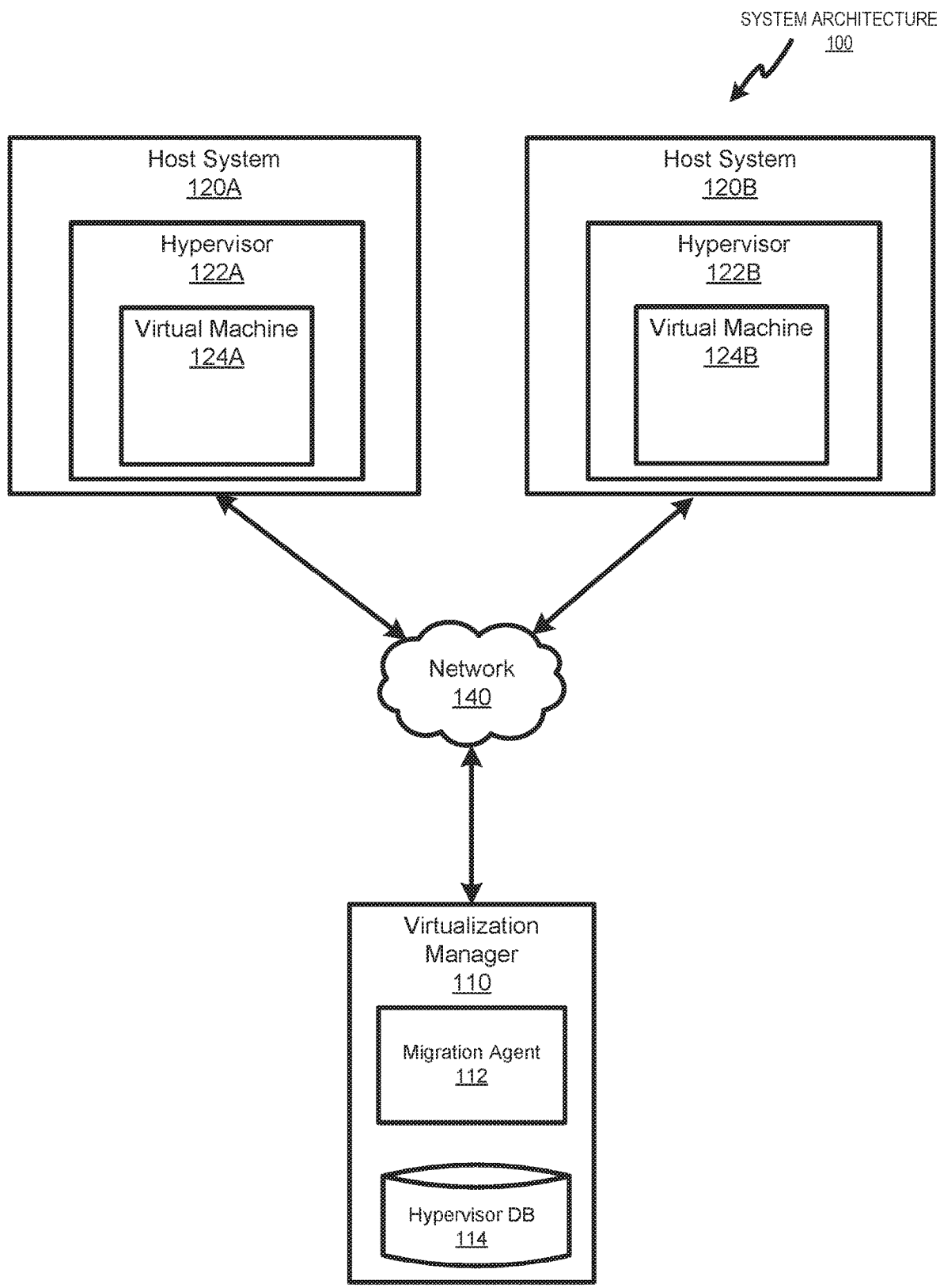
FIG. 1 illustrates an example system architecture in which implementations of the disclosure may operate in accordance with one or more aspects of the present disclosure.

Aspects of the present disclosure relate to transmitting a notification message in response to a virtual machine being migrated. Data centers may include host systems running operating systems (OS) that are communicatively coupled to one or more networks within the data center. The data center may include both physical and virtual network components having corresponding network addresses. Hypervisors executed by the host systems may run virtual machines (VMs). A hypervisor may operate on the one or more networks through one or more of the physical and virtual network components of the host system. For example, a host system may have three network interface cards (NICs) (e.g., NIC A, NIC B, NIC C) and the hypervisor may operate on a network by using NIC A. The VMs may also operate on one or more of the network addresses via the one or more networks of the data center. For example, a VM may operate on NIC A and NIC B.

When a VM is migrated from a first hypervisor of the data center to a second hypervisor, the VM may lose the location it operates on at the first hypervisor while keeping the same network addresses. Then, the VM may operate at a new location using the same network addresses on the second hypervisor. For example, while running on the first hypervisor a VM may operate at location A. Then, when the VM is migrated to the second hypervisor, the VM may operate at location B. Once the VM has been migrated to the new location (e.g., location B), the second hypervisor may generate and broadcast a notification message on the networks of the data center identifying the new location of the network addresses of the migrated VM. The network message may be received by remote network components of the data center. Examples of remote network components may include, but are not limited to network switches, routers, servers, bridges, gateways, etc. The network message may facilitate changes to the configuration of the remote network components of the data center in order to allow the migrated VM to operate. For example, in response to receiving a notification message, a network switch may switch from sending data for the network addresses of the migrated VM from location A to location B. In order to ensure the message is received by all the remote network components and the changes to the configuration are completed, the hypervisor may repeatedly broadcast the network message over the networks of the data center for a particular duration of time. For example, the hypervisor may broadcast the network message over the networks every 100 milliseconds (ms) for five seconds. However, the hypervisor repeatedly broadcasting the network message over the networks of the data center may consume bandwidth of the networks, decreasing performance of the data center. Furthermore, in the event that the migrated VM operates on NICs not supported by the second hypervisor, the second hypervisor may not be able to generate a notification message containing network address information corresponding to the unsupported NICs.

Accordingly, described herein are aspects of a VM generating and transmitting a network message and sending subsequent network messages until response messages have been received for each of the network addresses of the VM. In an example, the VM may receive an indication that the VM has been migrated. In response to receiving the indication, the VM may identify one or more network addresses associated with the virtual machine. The VM may generate a notification message corresponding to the one or more network addresses and transmit the notification message on networks for the one or more network addresses. Subsequently, the VM may determine whether a message has been received for each of the one or more network addresses at the new location. The message received for a network address at the new location may be referred to as a response message. The VM may then transmit a subsequent notification message in view of determining that at least one response message has not been received for at least one of the one or more network addresses.

According to aspects of the disclosure, the VM may transmit the notification message on networks for the one or more network addresses in view of a timing schedule. In such an example, the VM may periodically transmit the notification message according to the timing schedule until the VM has determined that a response message has been received for each of the one or more network addresses. In some implementations, the timing schedule may be determined in view of the number of network addresses.

Thus, the aspects of the present disclosure may be advantageous by reducing the number of notification messages being sent over the networks of the data center by the VM, thereby reducing bandwidth consumption and improving performance of the data center. For example, rather than repeatedly transmitting notification messages over the networks even after the notification message has been received for the one or more network addresses, the VM may transmit notification messages until response messages have been received for the one or more network addresses. In addition, by having the VM generate and transmit the notification message rather than the hypervisor, the VM may generate the notification message to include network address information for NICs that the VM operates on but are not supported by the hypervisor.

FIG. 1 illustrates an example system architecture 100 in which implementations of the disclosure may operate. The system architecture 100 may include a virtualization manager 110 and multiple host systems 120A and 120B coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

Each of the host systems 120A and 120B may include one or more processors communicatively coupled to memory devices and input/output (I/O) devices. Each of the host systems 120A and 120B may run a virtual machines 124A and 124B by executing hypervisors 122A and 122B, respectively, to abstract the physical layer, including processors, memory, and I/O devices, and present this abstraction to the virtual machines 124A and 124B as virtual devices. The virtual machines 124A and 124B may execute a guest OS that may utilize the underlying virtual devices, including virtual processors, virtual memory, and virtual I/O devices. One or more applications may be running on a virtual machine under the guest operating system. The virtual machines 124A and 124B may operate on one or more network addresses. For example, virtual machine 124A may operate on network addresses A and B and virtual machine 124B may operate on networks address C and network address D. In one implementation, the network addresses may correspond to media access control (MAC) addresses, where each of the MAC addresses correspond to a network interface card (NIC) that is used by the virtual machine (e.g., VMs 124A and 124B). In another implementation, the network addresses may correspond to virtual local area networks (VLANs) that are partitioned within the data center. The hypervisors 122A and 122B may create, run, manage, and monitor various aspects of the virtual machines 124A and 124B operations, including the processing, and storage, memory, and network interfaces. In an illustrative example, hypervisors 122A and 122B may be provided by a Virtual Desktop and Server Management (VDSM) daemon (not shown). The VDSM daemon may include an application programming interface (API) with which the virtualization manager 110 interfaces.

In certain implementations, host systems 120A and 120B may be grouped into one or more logical groups that may be also referred to as a "data center." A data center may represent the highest level of abstraction in a virtualization model. Each data center may be communicatively coupled, via the network 140, to one or more storage domains storing disk images for machines, such as virtual machines 124A and 124B.

The virtualization manager 110 may be hosted by a computer system (described in more detail below with reference to FIG. 6) and include one or more computer programs executed by the computer system for centralized management of the system architecture 100. In one implementation, the virtualization manager 110 may include various interfaces, including administrative interface, reporting interface, and/or application programming interface (API) to communicate with host systems 120A and 120B of system architecture 100, as well as to user portals, directory servers, and various other components, which are omitted from FIG. 1 for clarity.

Virtualization manager 110 may include VM migration functionality that migrates an active VM from one hypervisor to another hypervisor. In one example, virtualization manager 110 may include a migration agent 112 and a hypervisor database 114. The migration agent 112 may initiate the migration of a virtual machine (e.g., VMs 124A and 124B) and extract certain information, such as identification information (e.g., hypervisor name, hypervisor IP address, etc.), a set of configuration parameters (e.g., software packages, network settings, security settings, power management settings, etc.), and the like, and store the information in the hypervisor database 114 for each existing hypervisor 122A and 122B. Further, migration agent 112 may store received operating states and network address information from the VDSM of the host systems 120A and 120B for the hypervisors 122A and 122B in the hypervisor database 114.

In one implementation, the migration agent 112 may ensure that network components (e.g., remote network components, NICS, etc.) of the data center receive notification messages for each of the network addresses of the migrated VM by detecting that the VM migration has been complete, receiving the notification messages from the migrated VM and transmitting a copy of the notification message to the network components. For example, the migration agent 112 may receive notification messages for network address A and network address B from VM 124A. The migration agent 112 may transmit a copy of the notification message to the network components indicating the new location of the network addresses of the migrated VM. In another implementation, the migration agent 112 may ensure that the migrated VM receives a response message for each of the network addresses by receiving a response message for each of the network addresses and transmitting a copy of the response message to the migrated VM. For example, the migration agent 112 may receive response messages for network address A and network address B and transmit copies of the response messages to VM 124A.

Figure 2:
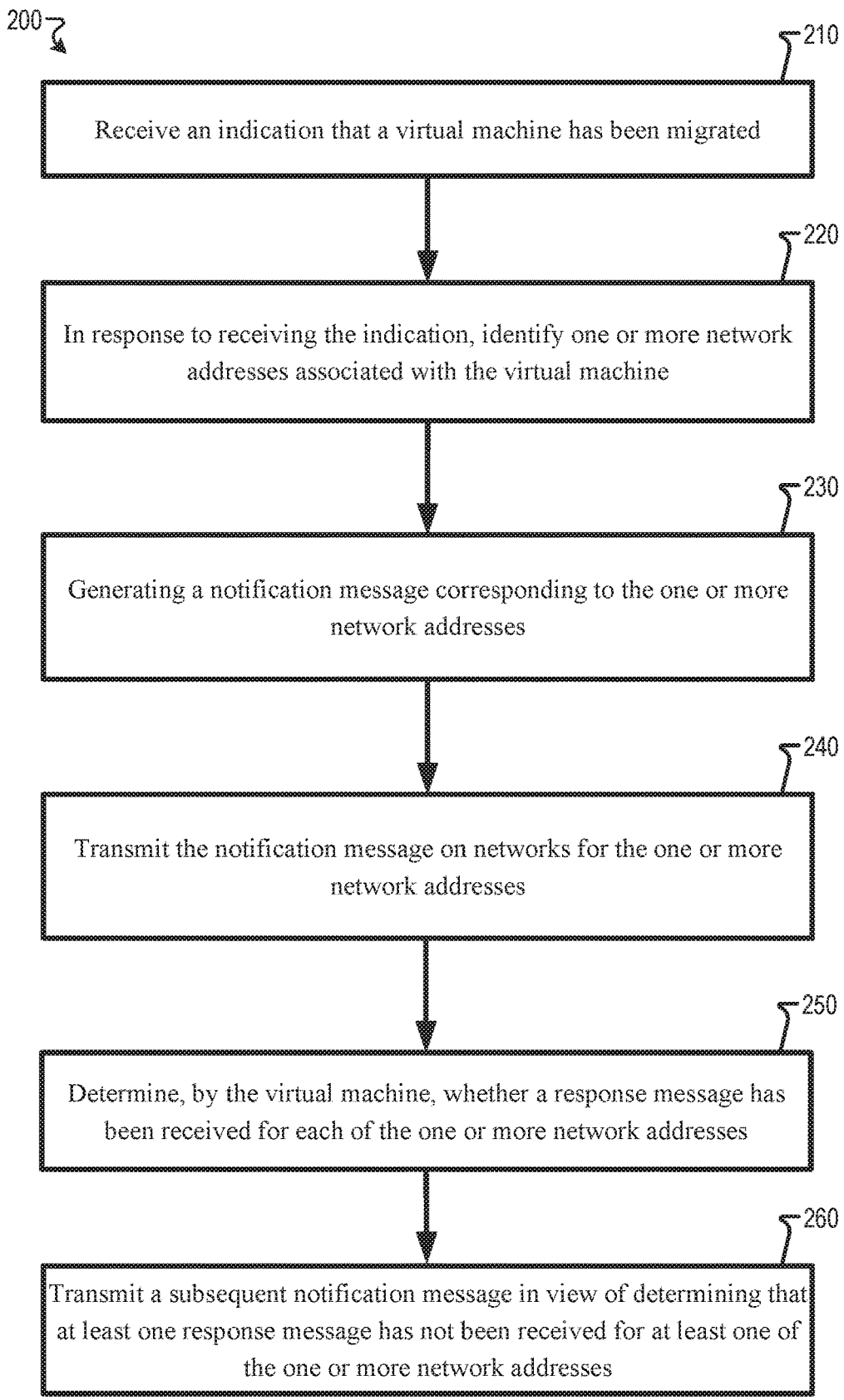
FIG. 2 depicts a flow diagram of an example method to transmit a notification message for one of more network addresses in response to migrating a VM from one hypervisor to another hypervisor in accordance with one or more aspects of the present disclosure.

FIG. 2 depicts a flow diagram of an example method 200 to transmit a notification message to one of more network addresses in response to migrating a VM from one hypervisor to another hypervisor. The method 200 may be performed by a processing device that may include hardware (e.g., processing logic, circuitry, dedicated logic, programmable logic, microcode, etc.), software (e.g., instructions run or executed on a processing device), or a combination thereof. In general, the method 200 may be performed by VMs 124A and/or 124B of FIG. 1. In one implementation, the method 200 may be performed by a guest OS running on VMs 124A and 124B of FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 200 may begin with a VM executed by a processing device receiving an indication that the VM has been migrated (block 210). The indication may be received from the hypervisor running the migrated VM (e.g., hypervisors 122A and 122B). The indication may include the new location of the one or more network addresses of the migrated VM. For example, when a VM is running on a first hypervisor it may operate on network addresses A and B at location A. Then, when the VM is migrated to a second hypervisor, the VM may operate on network addresses A and B at location B. In one implementation, the migrated VM may also receive a request from the hypervisor running the migrated VM to generate and transmit a notification message. For example, after the VM is migrated to the second hypervisor, the second hypervisor may send a request to the migrated VM to generate and transmit a notification message, as will be described in more detail below.

In response to receiving the indication, the migrated VM may identify the network addresses associated with the migrated VM (block 220). For example, upon receiving the indication from the second hypervisor, the migrated VM may identify that it operates on network addresses A and B. In one implementation, the migrated VM may identify the network addresses in view of the received indication. For example, the migrated VM may receive an indication from the second hypervisor and identify that it operates on network addresses A and B. In another implementation, the migrated VM may identify the network addresses by querying a data store of the host system (e.g., host systems 120A and 120B) running the migrated VM for network address information associated with the migrated VM.

The migrated VM may generate a notification message corresponding to the one or more network addresses that the VM is to operate on (block 230). The notification message may identify the virtual machine and may include network address information associated with the migrated VM. For example, the notification message may include information that the migrated VM operates on network addresses A and B at location B. In one implementation, the notification message may identify new physical addresses that correspond to the network addresses of the migrated VM. For example, when the VM is migrated from the first hypervisor to the second hypervisor, the VM may lose its old location (e.g., location A) and operate at a new location (e.g., location B).

The migrated VM may transmit the notification message generated at block 230 over networks of the data center (e.g., network 140) for the one or more network addresses (block 240). The notification message may be received by various hardware components of the data center, such as NICs, remote networking components, host systems and the like. In response to receiving the notification message, the components of the data center may change the configuration of the data center to send data to the migrated VM at the new location of the network addresses included in the notification message. For example, if a switch receives a notification message from the migrated VM that includes information indicating that network addresses A and B of the migrated VM are no longer at location A and are now at location B, then the switch may change its configuration and begin routing data for network addresses A and B of the migrated VM to location B. In some implementations, the migration agent 112 may receive the notification message and store the changes to the configuration of the data center in the hypervisor database 114.

Subsequent to transmitting the notification message, the migrated VM may determine whether a response message has been received for each of the one or more network addresses (block 250). The response message may identify that a remote network component, hardware component, host system or the like, has received the notification message from the VM for one of the network addresses included in the notification message generated at block 230. For example, when a switch receives the notification message from the migrated VM and changes the configuration to route data for network addresses A and B of the migrated VM to location B, a response message may be sent to the VM at location B by the switch confirming the notification message has been received. In one implementation, the response message may be transmitted by a host system (e.g., host systems 120A and 120B). In another implementation, the response message may be transmitted by the migration agent 112. The response message may also identify the virtual machine (e.g., specify a name or other such identification of the VM).

If a response message identifying the VM has not been received for each of the network addresses associated with the migrated VM, then the VM may transmit a subsequent notification message (block 260). The subsequent notification message may include similar information to the notification message generated at block 230. For example, if the migrated VM has not received a response message for network address B, then the migrated VM may transmit a subsequent notification message over networks for network address B. In one implementation, the migrated VM may transmit the subsequent notification message for network addresses that have not received a response message identifying the migrated VM. For example, if the migrated VM receives a response message for network address A, but does not receive a response message for network address B, then the migrated VM may transmit a subsequent notification message for network address B and may not transmit a subsequent notification message for network address A.

Figure 3:
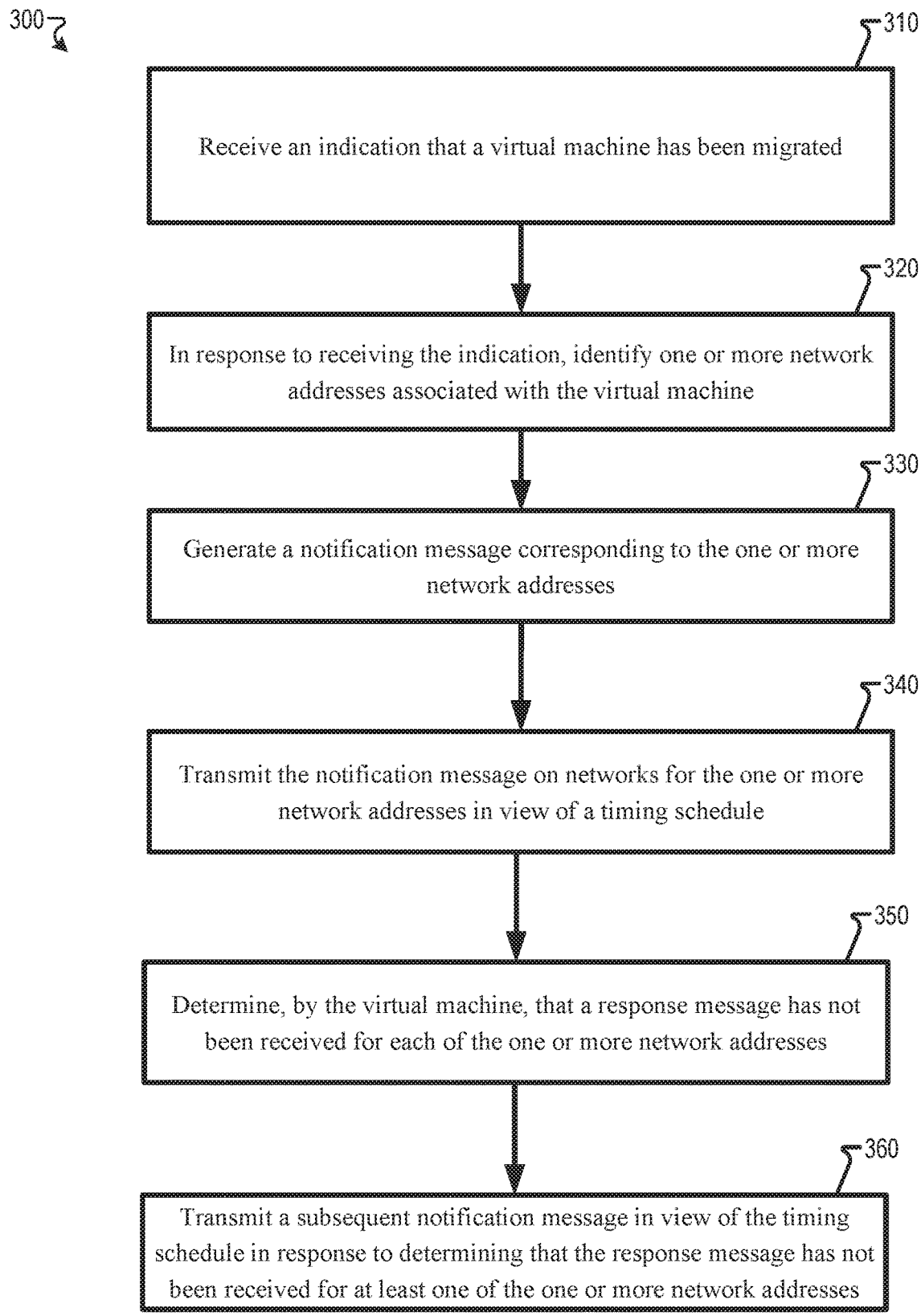
FIG. 3 depicts a flow diagram of an example method to transmit a notification message for one or more network addresses in view of a timing schedule in accordance with one or more aspects of the present disclosure.

FIG. 3 depicts a flow diagram of an example method 300 to transmit a notification message to one or more network addresses in view of a timing schedule. The method 300 may be performed by a processing device that may include hardware (e.g., processing logic, circuitry, dedicated logic, programmable logic, microcode, etc.), software (e.g., instructions run or executed on a processing device), or a combination thereof. In general, the method 300 may be performed by VMs 124A and/or 124B of FIG. 1. In one implementation, the method 300 may be performed by a guest OS running on VMs 124A and/or 124B of FIG. 1.

Method 300 may begin with a VM executed by a processing device receiving an indication that the VM has been migrated (block 310). The indication may be received from the hypervisor running the migrated VM (e.g., hypervisors 122A and 122B). The indication may include the new location of the one or more network addresses of the migrated VM. For example, when a VM is running on a first hypervisor it may operate on network addresses A and B at location A. Then, when the VM is migrated to a second hypervisor, the VM may operate on network addresses A and B at location B. In one implementation, the migrated VM may also receive a request from the hypervisor running the migrated VM to generate and transmit a notification message. For example, after the VM is migrated to the second hypervisor, the second hypervisor may send a request to the migrated VM to generate and transmit a notification message, as will be described in more detail below.

In response to receiving the indication, the migrated VM may identify the network addresses associated with the migrated VM (block 320). For example, upon receiving the indication from the second hypervisor, the migrated VM may identify it operates on network addresses A and B. In one implementation, the migrated VM may identify the network addresses in view of the received indication.

The migrated VM may generate a notification message corresponding to the one or more network addresses that the VM is to operate on (block 330). The notification message may include network address information associated with the migrated VM. For example, the notification message may include information that the migrated VM operates on network addresses A and B at location B. In one implementation, the notification message may identify new physical addresses that correspond to the network addresses of the migrated VM. For example, when the VM is migrated from the first hypervisor to the second hypervisor, the VM may lose its old location (e.g., location A) and operate at a new location (e.g., location B).

The migrated VM may transmit the notification message generated at block 330 over networks of the data center (e.g., network 140) for the one or more network addresses in view of a timing schedule (block 340). The timing schedule may correspond to a determined amount of time that is to elapse before a next notification message is to be transmitted. For example, if the determined amount of time is 100 ms, then the migrated VM may transmit a notification message every 100 ms. In one implementation, the timing schedule may correspond to the number of network addresses of the migrated VM. For example, a migrated VM having a large number of network addresses may have a timing schedule with a greater amount of time between the transmission of notification messages than a migrated VM with a smaller number of network addresses. The notification message may be received by various hardware components of the data center, such as NICs, remote networking components, host systems and the like. In response to receiving the notification message, the components of the data center may change the configuration of the data center to send data to the migrated VM at the new location of the network addresses included in the notification message. For example, if a switch receives a notification message from the migrated VM that includes information indicating that network addresses A and B of the migrated VM are no longer at location A and are now at location B, then the switch may change its configuration and begin routing data for network addresses A and B of the migrated VM to location B. In some implementations, the migration agent 112 may receive the notification message and store the changes to the configuration of the data center in the hypervisor database 114.

Subsequent to transmitting the notification method, the migrated VM may determine that a response message has not been received for each of the one or more network addresses (block 350). The response message may identify that a remote network component hardware component, host system or the like, has received the notification message from the VM at one of the network addresses included in the notification message generated at block 330. For example, when a switch receives the notification message from the migrated VM and changes the configuration to route data for network addresses A and B of the migrated VM to location B, a response message may be sent to the VM by the switch confirming the notification message has been received. In one implementation, the response message may be transmitted by a host system (e.g., host systems 120A and 120B). In another implementation, the response message may be transmitted by the migration agent 112.

If a response message has not been received for each of the network addresses associated with the migrated VM, then the migrated VM may transmit a subsequent notification message in view of the timing schedule (block 360). The subsequent notification message may include similar information to the notification message generated at block 330. Using the previous example of a timing schedule of 100 ms, if the migrated VM has not received a response message for network address B and 100 ms has elapsed, then the migrated VM may transmit a subsequent notification message over networks for network address B. In some implementations, the timing schedule may be a variable amount of time, where the timing schedule increases or decreases over time to transmit subsequent notification messages at either a higher or lower frequency. For example, the timing schedule may initially have the migrated VM transmit a notification message every 100 ms, but then increase the amount of time between transmissions of notification messages to every 500 ms. Conversely, the timing schedule may initially have the migrated VM transmit a notification message every 100 ms, but then decrease the amount of time between transmissions of notification messages to every 50 ms.

Figure 4:
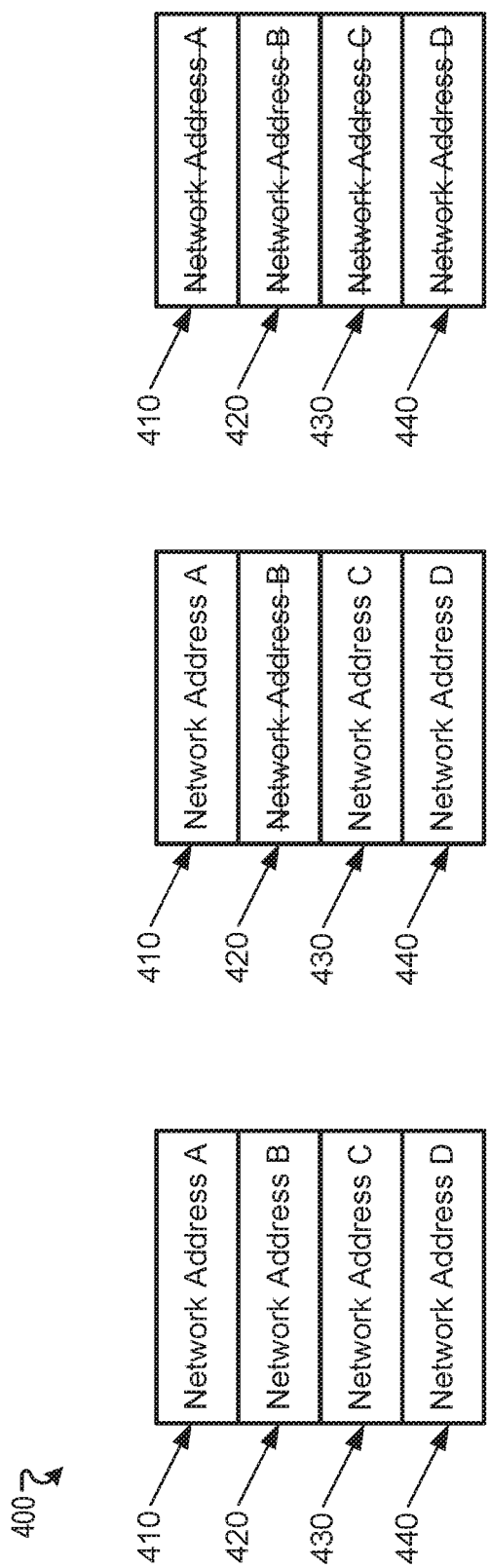
FIG. 4A illustrates a list of identified network addresses that a migrated VM is to operate on in accordance with one or more aspects of the present disclosure.
FIG. 4B illustrates the migrated VM determining whether a response message has been received for the identified network addresses in accordance with one or more aspects of the present disclosure.
FIG. 4C illustrates the migrated VM determining a response message has been received for each of the identified network addresses in accordance with one or more aspects of the present disclosure.

FIGS. 4A-4C are an illustration 400 of determining whether a response message has been received for each of the network addresses by the migrated VM, according to implementations. In some implementations, the determination of response messages being received may be performed by a guest OS running on the migrated VM.

FIG. 4A illustrates a list of identified network addresses that a migrated VM is to operate on. The network addresses associated with the migrated VM may be identified using the process disclosed at blocks 220 and 320 of FIGS. 2 and 3, respectively. The list may include Network Address A 410, Network Address B 420, Network Address C 430 and Network Address D 440. Although the present illustration shows the migrated VM operating on four network addresses, in other implementations the migrated VM may operate on any number of network addresses. In some implementations, the list of network addresses that the migrated VM is to operate on (e.g., Network Addresses A-D 410, 420, 430 and 440) may be stored in a data store of a host system (e.g., host systems 120A and 120B) the migrated VM operates on. In implementations, the list of identified network addresses that a migrated VM is to operate on may be stored in the hypervisor DB 114 of virtualization manager 110.

Subsequent to the identification of the network addresses associated with the migrated VM, the VM may generate a notification message corresponding to the identified network addresses as discussed in blocks 230 and 330 of FIGS. 2 and 3, respectively. The notification message may then be transmitted on networks for the one or more network addresses as discussed in blocks 240 and 340 of FIGS. 2 and 3, respectively.

FIG. 4B illustrates the migrated VM determining whether a response message has been received for the identified network addresses. The migrated VM may determine a response message has been received for one or more of the identified network addresses as described at blocks 250 and 350 of FIGS. 2 and 3, respectively. In some implementations, a guest OS running on the migrated VM may determine a response message has been received for one or more of the identified network addresses. In the present illustration, the migrated VM has received a response message for Network Address B 420 that identifies the migrated VM, but has not received response messages that identify the VM at Network Addresses A, C and D 410, 430 and 440. In some implementations, the response messages may be received from a remote network component, hardware component, host system or the like, that has received the notification message. In other implementations, the response messages may be received from migration agent 112 of FIG. 1.

Once the migrated VM has determined that a response message has not been received for each of the one or more network addresses, the migrated VM may transmit a subsequent notification message as described at block 260 of FIG. 2. For example, in FIG. 4B a response message has not been received for Network Addresses A, C and D 410, 430 and 440. Upon determining a message has not been received for Network Addresses A, C and D 410, 430 and 440, the migrated VM may transmit a subsequent notification message. In some implementations, the subsequent notification message may be transmitted in view of a timing schedule as described at block 360 of FIG. 3. In one implementation, the subsequent notification message may be transmitted by a guest OS running on the migrated VM. After the subsequent notification message has been transmitted, the migrated VM may determine if a response message has been received for all of the identified network addresses. In some implementations, the migrated VM may transmit subsequent notification messages on networks for the identified network addresses that the migrated VM has not receive a response message for. For example, using FIG. 4B, because a response message has not been received for Network Addresses A, C and D 410, 430 and 440, the subsequent notification messages may be transmitted on networks for Network Addresses A, C and D 410, 430 and 440.

FIG. 4C illustrates the migrated VM determining a response message has been received for each of the identified network addresses. The migrated VM may determine a response message has been received for each of the identified network addresses as described at blocks 250 and 350 of FIGS. 2 and 3, respectively. In some implementations, a guest OS running on the migrated VM may determine a response message has been received for each of the identified network addresses. In the present illustration, following the transmission of the subsequent notification message, the migrated VM has received a response message from Network Addresses A, C and D 410, 430 and 440. After the migrated VM has determined a response message has been received for all of the identified networks, the migrated VM may stop transmitting subsequent notification messages.

Figure 5:
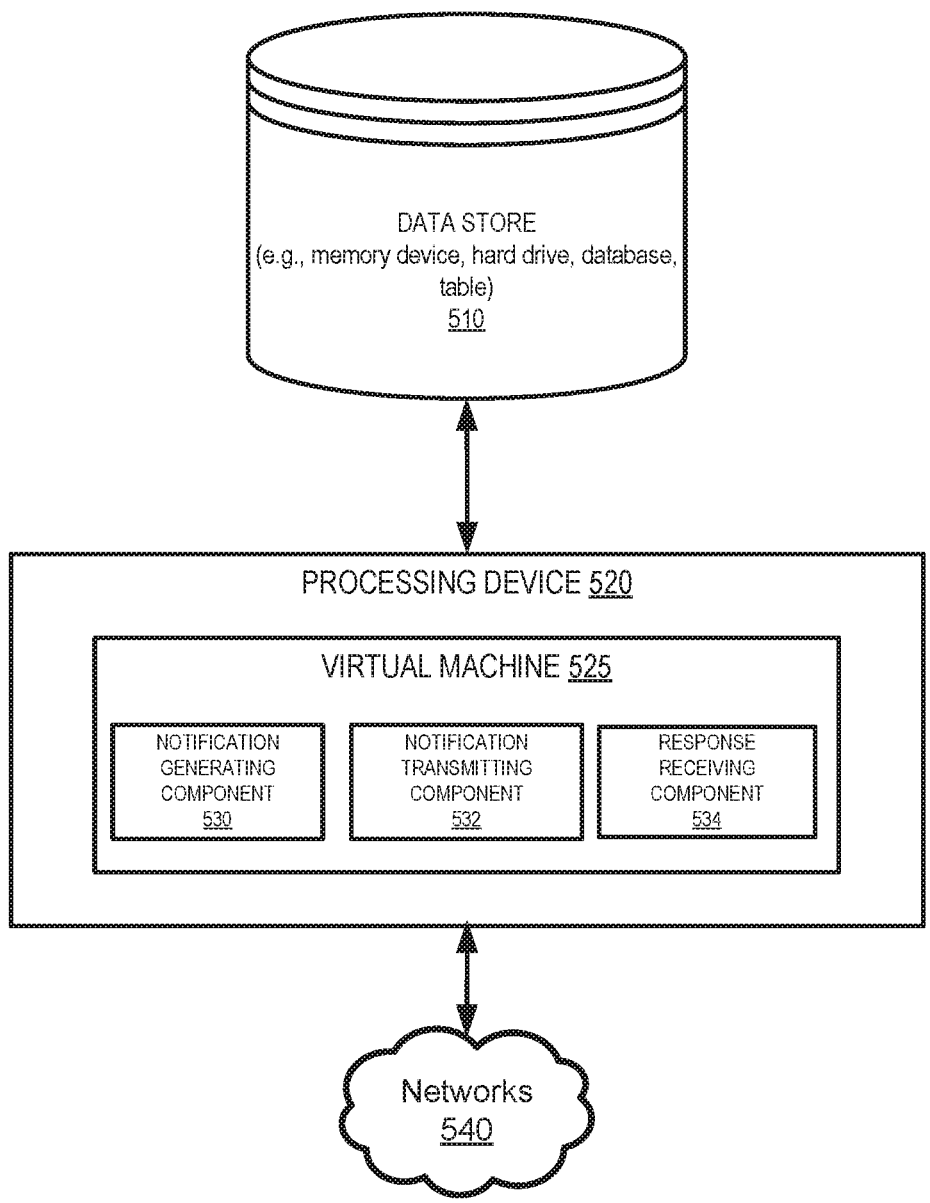
FIG. 5 illustrates an example apparatus in which implementations of the disclosure may operate in accordance with one or more aspects of the present disclosure.

FIG. 5 illustrates an example apparatus 500 in which implementations of the disclosure may operate. The apparatus 500 may be the same or similar to one of the distributed computing system, a network, or other computing devices. The data store 510 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the data store 510 may store information (e.g., network address information).

The apparatus 500 may include a processing device 520. The processing device 520 may include a notification generating component 530, a notification transmitting component 532, and a response receiving component 534.

The notification generating component 530 may generate notification messages that correspond to identified network addresses of a migrated VM. The notification transmitting component 532 may transmit the notification message generated by the notification generating component 530. The notification transmitting component 532 may also identify networks for the identified network addresses of the migrated VM. The notification transmitting component 532 may further transmit the subsequent notification messages on the identified networks. The response receiving component 534 may receive response messages for the identified network addresses. The response receiving component 534 may also determine that a response message has been received for each of the network addresses, as illustrated in FIGS. 4A-C.

Figure 6:
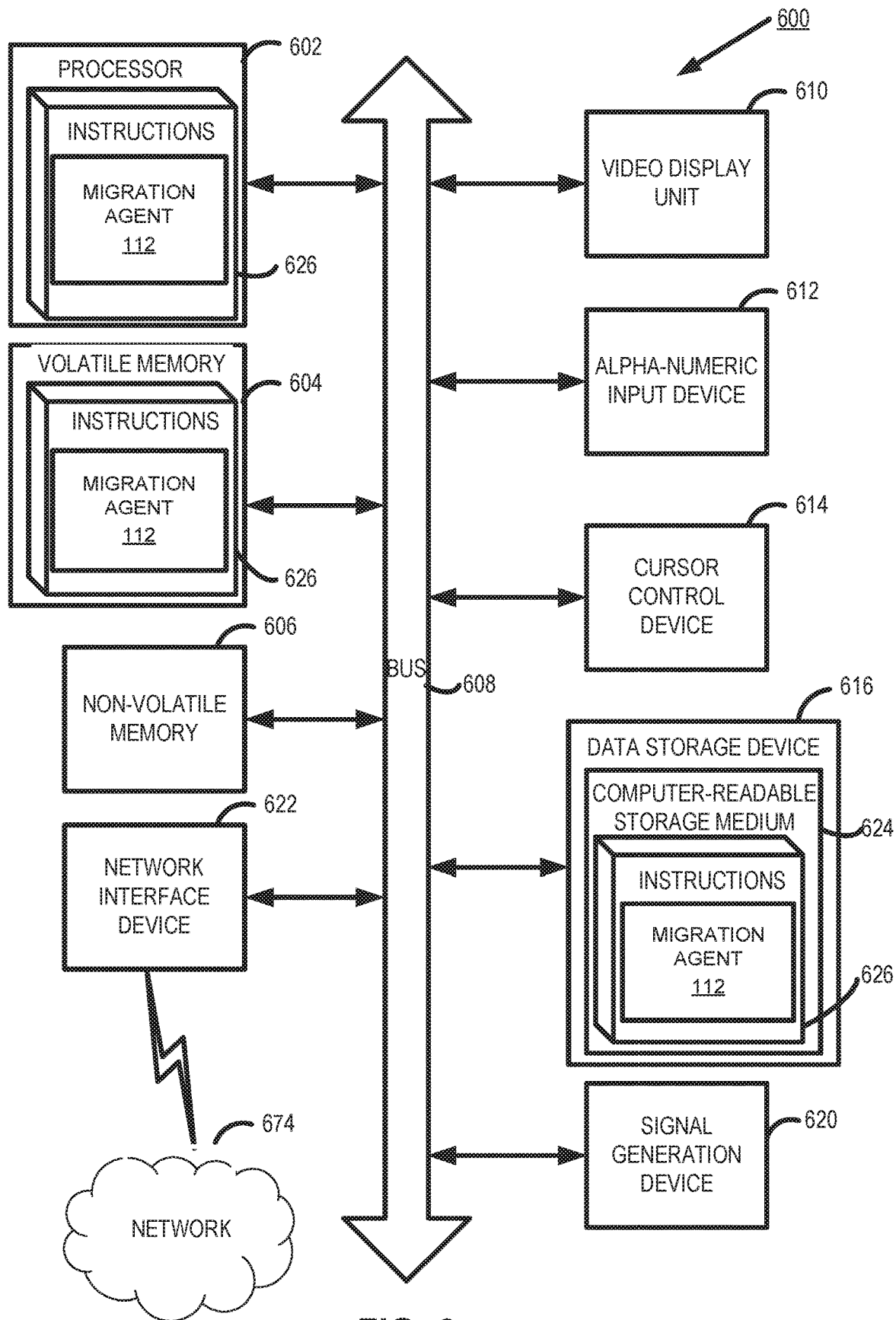
FIG. 6 depicts a block diagram of a computing system operating in accordance with one or more aspects of the present disclosure.

FIG. 6 depicts a block diagram of a computer system operating in accordance with one or more aspects of the present disclosure. In various illustrative examples, computer system 600 may correspond to a computing device within system architecture 100 of FIG. 1. The computer system 600 may host the virtualization manager 110. The computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding migration agent 112 of FIG. 1 for implementing methods 200 or 300.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 300 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a virtual machine executed by a processing device, from a hypervisor managing the virtual machine, an indication that the virtual machine has been migrated to a first host system of a group of host systems;
   in response to receiving the indication, identifying, by the virtual machine, one or more network addresses associated with the virtual machine;
   generating, by the virtual machine, a notification message corresponding to the one or more network addresses;
   transmitting, by the virtual machine, the notification message on a network for the one or more network addresses to a second host system of the group of host systems;
   identifying, by the virtual machine, each of the one or more network addresses that has not received a response message from the second host system; and
   transmitting, by the virtual machine, a subsequent notification message comprising the one or more network addresses that have not received a response message to the second host system.

2. The method of claim 1, further comprising:
receiving a request from the hypervisor running the virtual machine to generate and transmit the notification message.

3. The method of claim 1, wherein determining whether the response message has been received for each of the one or more network addresses comprises:
identifying a first portion of the one or more network addresses where a corresponding response message has been received; and
identifying a second portion of the one or more network addresses where a corresponding response message has not been received, wherein the transmitting of the subsequent notification message corresponds to transmitting the subsequent notification message to the second portion of the one or more network addresses and not transmitting the subsequent notification message to the first portion of the one or more network addresses.

4. The method of claim 1, wherein the virtual machine comprises a guest operating system and the guest operating system of the virtual machine determines whether the response message has been received for each of the one or more network addresses.

5. The method of claim 1, wherein the response message identifies that a remote network component communicatively coupled to the virtual machine via at least one network of the networks for the one or more network addresses has received the notification message from the virtual machine at a network address of the one or more network addresses.

6. The method of claim 1, wherein the one or more network addresses comprise a plurality of media access control (MAC) addresses that each correspond to a network interface card used by the virtual machine.

7. The method of claim 1, wherein the notification message identifies new physical addresses corresponding to the one or more network addresses of the migrated virtual machine.

8. A non-transitory computer readable storage medium having instructions that, when executed by a processing device, cause the processing device to:
receive, by a virtual machine executed by the processing device, from a hypervisor managing the virtual machine, an indication that the virtual machine has been migrated to a first host system of a group of host systems;
in response to receiving the indication, identify, by the virtual machine, one or more network addresses associated with the virtual machine;
generate, by the virtual machine, a notification message corresponding to the one or more network addresses;
transmit, by the virtual machine, the notification message on a network for the one or more network addresses to a second host system of the group of host systems, in view of a timing schedule;
identify, by the virtual machine, each of the one or more network addresses that has not received a response message from the second host system; and
transmit, by the virtual machine, a subsequent notification message comprising the one or more network addresses that have not received a response message to the second host system in view of the timing schedule.

9. The non-transitory computer readable storage medium of claim 8, wherein the timing schedule is determined in view of a number of network addresses of the one or more network addresses.

10. The non-transitory computer readable storage medium of claim 8, wherein to determine, by the virtual machine, that a response message has not been received for each of the one or more network addresses, the processing device is further to:
identify a first portion of the one or more network addresses where a corresponding response message has been received; and
identify a second portion of the one or more network addresses where a corresponding response message has not been received, wherein the transmitting of the subsequent notification message corresponds to transmitting the subsequent notification message to the second portion of the one or more network addresses and not transmitting the subsequent notification message to the first portion of the one or more network addresses.

11. The non-transitory computer readable storage medium of claim 8, wherein the virtual machine comprises a guest operating system and the guest operating system of the virtual machine determines whether the response message has been received for each of the one or more network addresses.

12. The non-transitory computer readable storage medium of claim 8, wherein the one or more network addresses comprise a plurality of media access control (MAC) addresses that each correspond to a network interface card used by the virtual machine.

13. The non-transitory computer readable storage medium of claim 8, wherein the response message identifies that a remote network component communicatively coupled to the virtual machine via at least one network of the networks for the one or more network addresses has received the notification message from the virtual machine at a network address of the one or more network addresses.

14. A system comprising:
a memory; and
a processing device, operatively coupled with the memory, to:
receive, by a virtual machine executed by the processing device, from a hypervisor managing the virtual machine, an indication that the virtual machine has been migrated to a first host system of a group of host systems;
in response to receiving the indication, identify, by the virtual machine, one or more network addresses associated with the virtual machine;
generate, by the virtual machine, a notification message corresponding to the one or more network addresses;
transmit, by the virtual machine, the notification message on a network for the one or more network addresses to a second host system of the group of host systems;
identify, by the virtual machine, each of the one or more network addresses that has not received a response message from the second host system; and
transmit, by the virtual machine, a subsequent notification message comprising the one or more network addresses that have not received a response message to the second host system.

15. The system of claim 14, wherein the processing device is further to:
receive a request from the hypervisor running the virtual machine to generate and transmit the notification message.

16. The system of claim 14, wherein to determine, by the virtual machine, that a response message has not been received for each of the one or more network addresses, the processing device is further to:
- identify a first portion of the one or more network addresses where a corresponding response message has been received; and
- identify a second portion of the one or more network addresses where a corresponding response message has not been received, wherein the transmitting of the subsequent notification message corresponds to transmitting the subsequent notification message to the second portion of the one or more network addresses and not transmitting the subsequent notification message to the first portion of the one or more network addresses.

17. The system of claim 14, wherein the virtual machine comprises a guest operating system and the guest operating system of the virtual machine determines whether the response message has been received for each of the one or more network addresses.

18. The system of claim 14, wherein the response message identifies that a remote network component communicatively coupled to the virtual machine via at least one network of the networks for the one or more network addresses has received the notification message from the virtual machine at a network address of the one or more network addresses.

19. The system of claim 14, wherein the one or more network addresses comprise a plurality of media access control (MAC) addresses that each correspond to a network interface card used by the virtual machine.

20. The system of claim 14, wherein the notification message identifies new physical addresses corresponding to the one or more network addresses of the migrated virtual machine.

* * * * *